United States Patent

Rosenberry et al.

[11] Patent Number: 5,843,576
[45] Date of Patent: Dec. 1, 1998

[54] FLOOR COVERING WITH COATING COMPOSITION

[75] Inventors: Angela S. Rosenberry, Manheim; Claude R.. Rupp, Lancaster; Songvit Setthachayanon, Elzabethtown, all of Pa.

[73] Assignee: Armstrong World Industries, Inc., Lancaster, Pa.

[21] Appl. No.: 963,176

[22] Filed: Nov. 3, 1997

Related U.S. Application Data

[62] Division of Ser. No. 583,277, May 9, 1997, Pat. No. 5,719, 227, which is a continuation of Ser. No. 566,545, Dec. 4, 1995, abandoned.

[51] Int. Cl.⁶ ............ B32B 27/00; B32B 27/40; C08F 2/46; C08G 18/10
[52] U.S. Cl. ............ 428/423.1; 522/12; 522/21; 522/90; 522/96; 524/590; 525/123; 525/455; 528/75
[58] Field of Search ............ 428/473.1; 524/590; 525/455, 123; 528/75; 522/12, 21, 90, 96

[56] References Cited

U.S. PATENT DOCUMENTS 4,870,152 9/1989 Meixner et al. ............ 258/49
5,003,026 3/1991 Ehrhart et al. ............ 528/49

*Primary Examiner*—Patrick D. Niland

[57] ABSTRACT

Floor coverings include a wear layer made from a coat composition including a multifunctional polyurethane (meth)acrylate oligomer. The multifunctional polyurethane is made by reacting a polyisocyanate with a functionality equal or higher than 3, a polyester polyol, and a hydroxyalkyl(meth)acrylate with a number average molecular weight of about 344 to about 472. The coating composition preferably includes a reactive (meth)acrylate diluent and a photoinitiator.

15 Claims, No Drawings

FLOOR COVERING WITH COATING COMPOSITION

CROSS-REFERENCE TO RELATED APPLICATION

This is a divisional of application Ser. No. 853,277, now U.S. Pat. No. 5,719,227 filed May 9, 1997, which is a continuation of Ser. No. 566,545, filed Dec. 4, 1995, now abandoned.

FIELD OF THE INVENTION

The present invention relates to floor coverings having a coating composition including a multifunctional polyurethane (meth)acrylate oligomer, and more particularly, radiation-curable coatings which have superior gloss retention, abrasion, gouge and stain resistance surfaces.

BACKGROUND OF THE INVENTION

Coatings as wear layers on floor coverings are designed to provide durability and cleanability to the flooring materials. Durability in this case refers to the ability of the coatings to resist wear and tear. The wear and tear come in two forms: (a) abrasion in micro scales at the very top of the surface that results in changes of gloss and appearance, and (b) deep scratch and gouge damages from soils or other grit particles dragged under foot traffic. Cleanability refers to the ability of the coatings to resist stain and chemical attacks, and maintain their original appearance.

Many coating systems have been used by the flooring industry to achieve durability and cleanability. Polyurethane-based coatings, in particular, are well known in the art for such purposes.

U.S. Pat. No. 3,929,929 discloses an improved vinyl urethane resin comprising the reaction product of a diol, a polyisocyanate having a functionality equal to from about 2.1 to about 3.0, and a hydroxyl terminated ester of acrylic or methacrylic acid. The resin is prepared with either vinyl or allyl monomers and cobalt-activated peroxide-cured to form castings, coatings, and laminates.

U.S. Pat. No. 4,034,017 discloses a solvent-soluble coating composition comprising polyisocyanate, diol, and a hydroxyalkyl ester of an ethylenically unsaturated carboxylic acid, one or more copolymerizable monomers and a curing agent. When cured, the composition is claimed to be durable, adherent, and highly flexible.

U.S. Pat. No. 4,342,793 discloses a method for forming interpenetrating polyurethane and polyacrylate networks. The system is a two-component composition based on a radiation sensitive diluent, a saturated acrylic polyol and a polyisocyanate. Cure is accomplished by radiation and then heat. The fully cured composition is described as interpenetrated or one in which there is no crosslinking between the reactive diluent and the urethane linked copolymer. Although the interpenetrated resin composition is claimed to form tough and hard coatings on various substrates, including floor coverings, the coating has a limited pot-life which renders complications for the application of the coating.

U.S. Pat. No. 5,003,026 discloses an improved UV-curable coating for a floor covering which comprises an oligomer which is the reaction product of a polyester polyol with a diisocyanate and a monohydroxymonoacrylate. The oligomer is diluted in mono- and diacrylate reactive monomers and photoinitiators. The coating when UV-cured provides good gloss retention, hydrolytic stability but poor stain resistance.

These and other references are directed to polyurethane-based compositions which provide either gloss retention, stain resistance or gouge, but none of the references offer compositions that encompass all three properties. Consequently, the need exists for performance coatings which have the aforementioned gloss retention, stain, abrasion and gouge resistance for floor coverings.

Accordingly, it is one of the objectives of the present invention to provide a novel radiation-curable composition which will demonstrate superior gloss retention, gouge, abrasion, and stain resistance.

Another objective of the present invention is to provide a floor covering having a wear layer of the coating composition.

Yet another objective of the present invention is to provide an oligomer which will yield a composition having the above-stated properties.

These and other advantages of the present invention will become apparent from the detailed descriptions of preferred embodiments which follow.

SUMMARY OF THE INVENTION

The oligoiner which compromises the coating composition of the present invention is the reaction product of a polyisocyanate with a functionality equal or higher than 3, preferably equal to or higher than 3.5, an aromatic polyester, preferably a phthalate polyester polyol, and a hydroxyalkyl (meth)acrylate with a molecular weight of about 344 to about 472. The resulting oligomer will be liquid at room temperature, highly branched, and have multi(meth)acrylate functionality. As used herein, term "(meth)acrylate" and its variants mean "acrylate, methacrylate and mixtures thereof."

The coating composition may consist essentially of the oligomer. However, the oligomer without a diluent is viscous and difficult to coat. Therefore the coating composition of the present invention preferably includes a diluent. The preferred diluent is a reactive (meth)acrylate diluent.

The coating composition may be cured either by electron beam curing or UV curing. The preferred composition includes a photoinitiator and the composition is cured with both electron beam and UV light.

DETAILED DESCRIPTION OF THE INVENTION

It is well known that abrasion resistance and non-yellowing coatings can be obtained from radiation-curable polyurethane (meth)acrylate based on aliphatic diisocyanates such as isophorone diisocyanate (IPDI) or methylene-bis(4-cyclohexylisocyanate) (Bayer Corporation's Desmodur W). However, higher functionality polyisocyanates such as isocyanurate, biuret and allophanate have not been used in the radiation-cured coatings, nor are such uses disclosed in the prior art.

When used, they are one component of a two component system and require thermal cure to achieve their useful properties. U.S. Pat. No. 4,342,793, for example, discloses the use of Desmodur N-100 (a biuret) in a thermally cured reaction with a hydroxy-functional acrylic resin. The NCO/OH reaction is a two-component system within a UV-cured coating matrix to produce a polyurethane-polyacrylate interpenetrating network. Because of their high reactivity, two-component coating systems such as this must be mixed just prior to the application. After the two-components are put together, there is a limited pot-life in which the mixture must be used up before it is rendered useless. Further, U.S. Pat. No. 4,342,793 does not disclose the reaction of the polyisocyanate with a long chain hydroxyalkyl(meth)acrylate or an aromatic (meth)acrylic polyol.

It was discovered that reacting isocyanurate trimers such as Bayer's Desmodur N3300 or biurets such as Bayer's Desmodur N100 or N3200 with a long chain hydroxyalkyl (meth)acrylate and a polyester polyol could produce one-component radiation-curable oligomers which have a long shelf-life. The oligomers would produce radiation-curable coatings of superior stain, gloss retention, abrasion and gouge resistance.

Preferred oligomers were prepared by reacting about 0.7 to 1.5 equivalents of Desmodur N-3300 with 1.0 equivalent of a mixture of hydroxyalkyl(meth)acrylate and phthalate polyester polyols (equivalent ratio of hydroxyalkyl(meth) acrylate to polyester polyol greater than about 0.10) to produce a highly branched, multifunctional (meth)acrylate polyurethane product. The product was mixed with acrylate reactive diluents and photoinitiators to form a coating composition. Especially valuable properties were obtained when substantial quantities of high molecular weight, ethoxylated and propoxylated tri(meth)acrylates were the principle reactive diluents.

An aromatic polyester polyol is defined as a polyester polyol of acid number of less than about 15, preferably less than about 5, comprising the reaction product of an equivalent excess of one or more polyols of equivalent weight less than 150 with at least one aromatic polycarboxylic acid. If the polycarboxylic acid is a phthalic acid derivative the result is a phthalate polyester polyol. Preferably at least 50 equivalent percent of the polycarboxylic acid is isophthalic acid, phthalic acid, terephthalic acid, phthalic anhydride, or dimethyl terephthalate.

The preferred multifunctional polyurethane (meth) acrylate of the present invention can be represented by the following Formula 1.

where m=0, 1 or 2 n=1

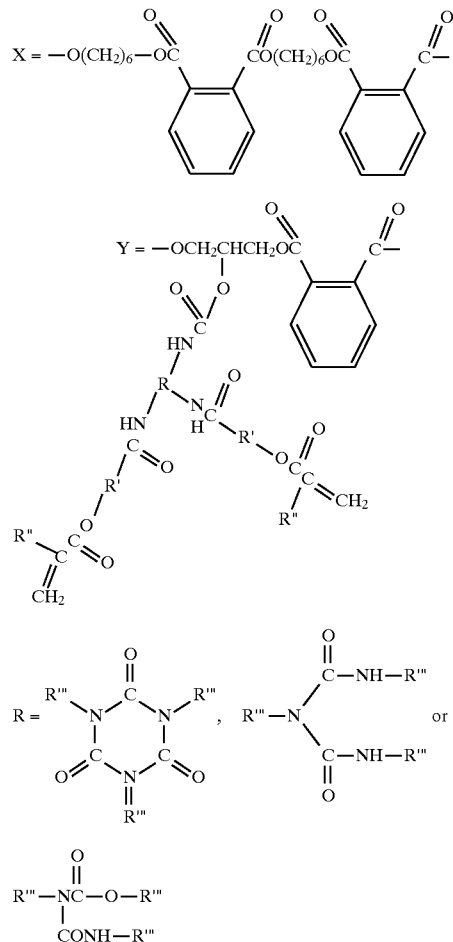

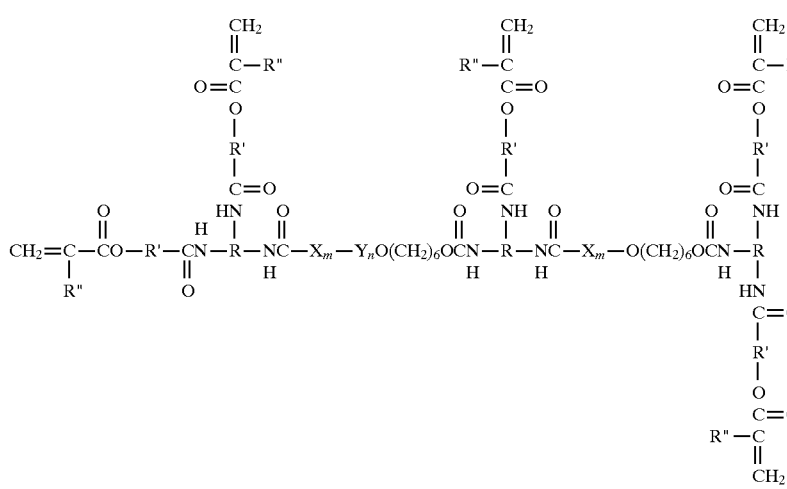

Formula 1

-continued

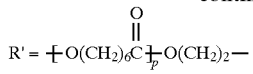

p=2 or 3
R"=H or CH₃

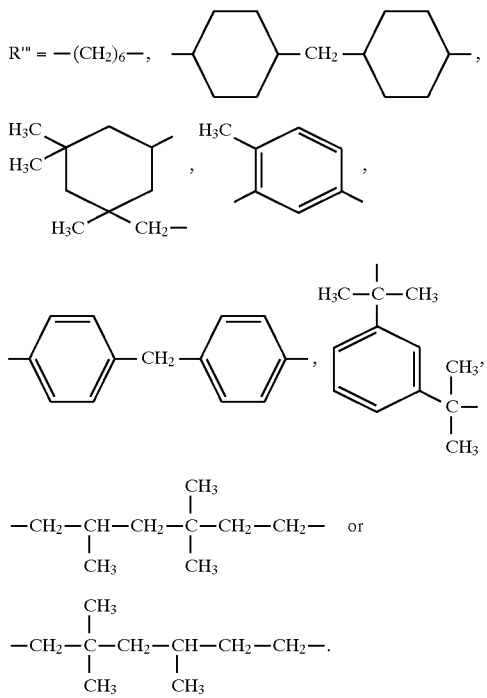

The isocyanurates, biurets and allophanates of the present invention can be aliphatic, cycloaliphatic or aromatic such as those prepared from 1,6 hexamethylene diisocyanate (Desmodur H); methylene-bis(4-cyclohexylisocyanate); 1-isocyanato-3-isocyanatomethyl-3,5,5-trimethylcyclohexane; 2,2,4-trimethylhexamethylene diisocyanate; 2,4,4-trimethylhexamethylene diisocyanate; toluene diisocyanate; methylenediphenyl diisocyanate; and tetra methylxylene diisocyanate. The preferred polyisocyanates are the trimer isocyanates represented by R in Formula 1 (isocyanurate, biuret and allophanate). The most preferred trimers are those derived from 1,6-hexamethylene diisocyanate which is commercially available as Desmodur N from Bayer Corporation.

The preferred hydroxyalkyl(meth)acrylates are polycaprolactone based hydroxy(meth)acrylates according to the skeletal structures in Formula 2:

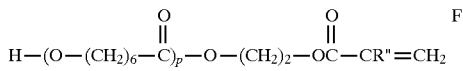

where R" = H or CH₃, and
p = 2 or 3.

The polycaprolactone based hydroxy(meth)acrylates are supplied commercially by Union Carbide as Tone M-100 (number average molecular weight of about 344) and by San Esters Corporation as Placcel FA and FM series (number average molecular weights from about 230 to about 472).

The preferred oligomer is prepared from Desmodur N-3300, Tone M-100 and a predominantly 1,6-hexylene phthalate polyester polyol. A predominantly 1,6-hexylene phthalate polyester polyol is defined as a phthalate polyester polyol wherein at least 50 equivalent percent of the <150 equivalent weight (eq. wt.) polyol is 1,6-hexanediol and wherein at least 50 equivalent percent of the polycarboxylic acid is phthalic acid or phthalic anhydride.

Phthalate polyester polyols suitable for the present invention can be prepared by a procedure similar to example 1 of U.S. Pat. No. 4,138,299 by reacting acids such as isophthalic, terephthalic, phthalic (or phthalic anhydride), adipic, azelaic, and/or sebacic with polyols such as 1,6-hexanediol; trimethylol propane; triethylene glycol; neopentyl glycol; cyclohexane dimethanol; 2-methyl-1,3-propanediol; trihydroxyethylisocyanurate; and glycerol in the presence of a catalyst such as dibutyltin bislauryl mercaptide or stannous oxalate.

Suitable (meth)acrylate reactive diluents include (meth)acrylic acid, isodecyl (meth)acrylate, N-vinyl formamide, isobornyl (meth)acrylate, tetraethylene glycol (meth)acrylate, tripropylene glycol (meth)acrylate, hexanediol di(meth)acrylate, ethoxylate bisphenol-A di(meth)acrylate, ethoxylated neopentyl glycol di(meth)acrylate, propoxylated neopentyl glycol di(meth)acrylate, ethoxylated tripropylene glycol di(meth)acrylate, glyceryl propoxylated tri(meth)acrylate, tris (2-hydroxy ethyl) isocyanurate tri(meth)acrylate, pentaerythritol tri(meth)acrylate, pentaerythritol tetra(meth)acrylate, dimethylol propane tri(meth)acrylate dipentaerythritol monohydroxypenta(meth)acrylate, and trimethylol propane tri(meth)acrylate and its ethoxylated and propoxylated analogues of the skeletal structures in Formula 3:

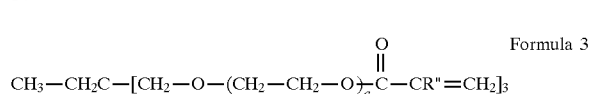

or

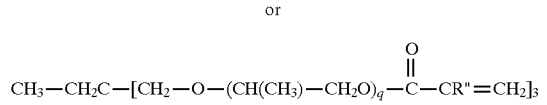

where
R"=H, or CH₃, and
q=0, 1, 2, . . . , 9 or 10.

The preferred (meth)acrylate reactive diluents are the multifunctional acrylates with number average molecular weights of about 226 to about 2000. Examples of such are tetraethylene glycol diacrylate with a molecular weight of about 302, ethoxylated bisphenol-A diacrylate with a number average molecular weight of about 776 (SR602 from Sartomer Company), trihydroxyethyl isocyanurate triacrylate with molecular weight of about 423 (SR368 from Sartomer), trimethylol propane triacrylate with a number average molecular weight of about 296 (SR351 from Sartomer), and ethoxylated trimethylol propane triacrylates with number average molecular weights from about 400 to about 2000 (SR454, SR499, SR502, SR9035, and SR 415 from Sartomer Company and Photomer 4155 and Photomer 4158 from Henkel Corporation)

To practice the present invention, it is preferred to employ photoinitiators by themselves or in combinations and/or in combination with photoactivators and photosensitizers Suitable photoinitiators include benzophenone; 4-methylbenzophenone; benzyl dimethyl ketal; diethoxy acetophenone; benzoin ethers; thioxanthones; 1-hydroxycyclohexyl phenyl ketone (Irgacure 184 from Ciba Corp); 2-hydroxy-2-methyl-l-phenol-propane-1-one; 4-(2-hydroxyethoxy)phenyl-(2-hydroxy-2-methylpropyl) ketone; 2,4,6-trimethylbenzoyl diphenylphosphine oxide;

bis (2,6-dimethoxybenzoyl)-2,4,4-trimethylpentyl phosphine oxide; 2,2-dimethoxy-2-phenyl acetophenone; 2-benzyl-2-N,N-dimethylamino-1-(4-morpholinophenyl)-1-butanone; and 2-methyl- 1-[4-(methylthio)phenyl]-2-morpholino propan-1-one. A preferred photoinitiator is benzophenone, which may be used in conjunction with other photoinitiators, photoactivators and/or photosensitizers. A preferred combination is about two parts benzophenone per one part of 1-hydroxycyclohexyl phenyl ketone.

In addition, other components which may be useful can also be included in the present invention. These include flow additives, free radical inhibitors, thermal stabilizers, light stabilizers, dyes, pigments, optical brighteners, flatting agents, plasticizers, and others as would be obvious to one skilled in the art.

In preparing the oligomer of the present invention, a catalyst such as dibutyltin dilaurate may or may not be included to aid the urethane formation between the polyisocyanate and the hydroxy-containing components. However, it is advantageous to prepare the oligomer in a clean vessel free of moisture or water. The vessel is equipped with dry-air blanket and a heating jacket, and has continuous mixing. It is further advantageous to prepare the oligomer in the presence of substantial amounts of the reactive acrylate diluents to help control heat of reactions which may otherwise cause undesired side reactions. The reaction temperature is maintained at about 75° C. to about 85° C. Higher temperatures can initiate undesired free radical polymerization. On the other hand, lower temperatures will retard or slow down the NCO/OH reaction.

The compositions of the present invention can be applied by brushing, roller, gravure, spin, flow, or curtain coating at room temperature to an elevated temperature of up to about 75° C. The composition of the present invention has an excellent high temperature stability. Prolonged exposure to elevated temperature does not have any adverse effect on its superior properties. The radiation cure is achieved with ultraviolet or electron beam radiation. Although no photoinitiator is required when the composition is cured by electron beam, including a photoinitiator can further enhance the properties of the present invention.

The present invention can be readily understood from the examples that follow. However, the following examples are provided to illustrate but not to limit the scope of the present invention.

TABLE 1

Polyols Used in the Following Illustrative Examples

Polyol 1: hydroxyl number = 185, acid number < 0.5
    prepared from: 20.0 equivalents of phthalate anhydride
                   23.8 equivalents of 1,6-hexanediol
                   6.0 equivalents of glycerine
polyol 2: hydroxyl number = 115, acid number < 0.6
    prepared from: 20.0 equivalents of phthalate anhydride
                   25.75 equivalents of 1,6-hexanediol
polyol 3: hydroxyl number = 315, acid number < 0.6
    prepared from: 20.0 equivalents of adipic acid
                   16.0 equivalents of trimethyl propane
                   20.0 equivalents of neopentyl glycol

EXAMPLE 1

| | | |
|---|---|---|
| 1. SR351 reactive diluent | 16 parts |
| 2. SR499 reactive diluent | 10 parts |
| 3. SR502 reactive diluent | 10 parts |
| 4. Tone M-100, hydroxyacrylate from Union Carbide | 32.58 parts |
| 5. Polyol 1, hydroxyl equivalent weight (eq. wt.) of 303 | 8.87 parts |
| 6. Desmodur N3300, Bayer's isocyanurate trimer eq. wt. of 195 | 22.55 parts |

The above ingredients were mixed in a clean and dry vessel, heated, with stirring and under a trickle of dry air blanket, to 80° C. for four hours to react the NCO groups of ingredient 6 to the OH groups of ingredients 4 and 5. Upon cooling to 50° C. the following ingredients were added to the vessel with stirring:

| | |
|---|---|
| 7. Irgacure 184 (from Ciba) | 1.0 parts |
| 8. Benzophenone | 2.0 parts |
| 9. Silwet L7604 | 0.2 parts |

This composition had 64% oligomer and 36% reactive diluents, a NCO/OH of 0.933 and a hydroxyacrylate/polyol of 3.24. Viscosity at 25° C. of the composition was 14,500 cps. Kept away from actinic light sources, it was stable at room temperature for more than 2 years. At 70° C., it remained in its liquid state for over a 6-month period.

The above composition was curtain coated 3-mil thick on a rigid vinyl clad composite tile base. The coating was UV-cured 2 passes under a pair of 200-watt per inch medium pressure mercury lamps at a belt speed which resulted in a total UV dose of 2.32 J/sq cm.

Two comparative compositions were prepared, curtain coated on a rigid vinyl clad composite tile base, and UV-cured with the same dose of energy as the composition of the present invention. The two comparative compositions are both used on commercial floor covering. Comparative Composition 1 was similar in composition to Example 1 of U.S. Pat. No. 5,003,026. Comparative Composition 2 was similar in composition to product B of U.S. Pat. No. 4,421,782.

The composition of Example 1 of the present invention and the two comparative compositions were subject to the following performance evaluations:

(1) Stain Resistance: Sample specimens were exposed 24 hours to 6 household stains consist of ink, magic marker, hair dye, tincture of iodine, shoe polish, and driveway sealant. The specimens were then cleaned with isopropyl alcohol, soap and water. Stain areas were determined by a calorimeter for LAB color changes before and after exposure to the stains. Colorimeter reading results were reported in ΔE. Higher ΔE indicated poorer staining resistance properties.

(2) Gloss Retention: This was an accelerated abrasion resistance test. Sample specimens were laid under a leather clad traffic wheel which traveled in a circular motion. The wheel itself rotated along its own axle. Abrasive soils were applied on top of the specimens while the wheel traveled in the circular motion on top of them. After 90 minute duration, the specimens were determined for their retention of gloss with a gloss meter. Higher gloss retention indicated better abrasion resistance. The results of this test coordinate well with actual gloss loss of the product in the field.

(3) Deep Scratch and Gouge Resistance: This was an accelerated test. The test was similar to the gloss retention test except the rotation of the wheel along its axle is at a different speed from its travel in circular motion and a more abrasive mixture of soils was used. The outcomes of the test were rated against a control with known performance. A higher rating indicated a better scratch and gouge resistance property.

TABLE 2

|  | Example 1 | Comparative 1 | Comparative 2 |
|---|---|---|---|
| Stain resistance | 110 | 260 | 210 |
| Gloss retention | 87 | 85 | 45 |
| Gouge resistance | 7 | 3 | 3 |

EXAMPLE 2

The series of formulations in Table 3 were prepared, UV-cured, and tested as in Example 1. The results which are presented in the bottom of Table 3 showed that polyurethane acrylates, the reaction products of trifunctional isocyanates provided superior gloss retention, stain resistance, abrasion, scratch and gouge resistance.

TABLE 3

| Example | A | B | C | D |
|---|---|---|---|---|
| Oligomer Reactants (in % by weight) | | | | |
| Desmodur N3390 | — | — | — | — |
| Desmodur N3300 | 30.30 | 35.78 | 19.58 | 28.71 |
| Polyol 1 | 8.97 | 8.34 | 21.81 | 6.91 |
| Polyol 2 | — | — | — | — |
| Tone 100 | 40.73 | — | 10.61 | 44.38 |
| Placcel FA1 | — | 35.88 | — | — |
| Reactive Diluents (in % by weight) | | | | |
| SR351 | — | — | — | — |
| SR368 | — | — | — | — |
| SR454 | — | — | — | — |
| SR499 | — | — | 24.00 | — |
| SR502 | 20.00 | 20.00 | 24.00 | 20.00 |
| Photoinitators (in phr) | | | | |
| Benzophenone | 2.00 | 2.00 | 2.00 | 2.00 |
| Irgacure 184 | 1.00 | 1.00 | 1.00 | 1.00 |
| Flow Aids (in phr) | | | | |
| Silwet L7604 | 0.2 | 0.2 | 0.2 | 0.2 |
| Oligomer Equivalent Ratio | | | | |
| NCO/OH | 1.05 | 0.999 | 0.976 | 0.969 |
| Hydroxyacrylate /polyol | 4.0 | 5.67 | 0.43 | 5.6 |
| Comparative Properties | | | | |
| Stain Resistance, ΔE | 177 | 130 | 139 | 200 |
| Gloss Retention, % | 96 | 87 | 96 | 96 |
| Gouge Resistance | 7 | 5 | 3 | 6 |
| Example | E | F | G | H |
| Oligomer Reactants (in % by weight) | | | | |
| Desmodur N3390 | — | — | — | — |
| Desmodur N3300 | 17.54 | 27.45 | 22.03 | 17.54 |
| Polyol 1 | 22.32 | — | 8.87 | 22.31 |
| Polyol 2 | — | 13.8 | — | — |

TABLE 3-continued

| Example | A | B | C | D |
|---|---|---|---|---|
| Tone M100 | 6.00 | 38.75 | 32.58 | 6.01 |
| Placcel FA1 | — | — | — | — |
| Reactive Diluents (in % by weight) | | | | |
| SR351 | — | — | 10.00 | — |
| SR368 | — | — | — | — |
| SR454 | 27.89 | — | — | 27.90 |
| SR499 | 26.25 | 20.00 | 13.00 | — |
| SR502 | — | — | 13.00 | 26.25 |
| Photoinitators (in phr) | | | | |
| Benzophenone | 2.00 | 2.00 | 2.00 | 2.00 |
| Irgacure 184 | 1.00 | 1.00 | 1.00 | 1.00 |
| Flow Aids (in phr) | | | | |
| Silwet L7604 | 0.2 | 0.2 | 0.2 | 0.2 |
| Oligomer Equivalent Ratio | | | | |
| NCO/OH | 0.987 | 0.998 | 0.911 | 0.987 |
| Hydroxyacrylate /polyol | 0.24 | 4.0 | 3.24 | 0.24 |
| Comparative Properties | | | | |
| Stain Resistance, ΔE | 36 | 176 | 158 | 90 |
| Gloss Retention, % | 90 | 91 | 92 | 91 |
| Gouge Resistance | 3 | 7 | 7 | 3 |

Desmodur N3300 is a trimer isocyanurate derived from hexamethyl diisocyanate. It has an equivalent weight of 195 and an average functionality of 3.5.

Desmodur N3390 is a 90% solid version of Desmodur N3300.

Placcel FA1 has a molecular weight of 230.

Silwet L7604 is a silicone surfactant of OSi Specialties.

EXAMPLE 3

The series of formulations in Table 4 were prepared, UV-cured, and tested as in Example 1. Examples N and O are comparative examples. The results are presented at the bottom of Table 4. The results showed superior properties could be obtained from trifunctional isocyanate for the polyurethane acrylates for the present invention.

TABLE 4

| Example | I | J | K | L | M | N | O |
|---|---|---|---|---|---|---|---|
| Oligomer Reactants (in % by weight) | | | | | | | |
| Desmodur N100 | 22.25 | — | — | — | — | — | — |
| Desmodur N3200 | — | 21.47 | — | — | — | — | — |
| Desmodur N3400 | — | — | 23.73 | — | — | — | — |
| Desmodur H | — | — | — | — | — | 16.91 | — |
| Desmodur W | — | — | — | — | — | — | 31.30 |
| Polyisocyanate A | — | — | — | 25.43 | — | — | — |
| Polyisocyanate B | — | — | — | — | 23.57 | — | — |
| Polyol 1 | 8.93 | 9.10 | 14.90 | 8.75 | 8.61 | — | 16.42 |
| Polyol 3 | — | — | — | — | — | 11.94 | — |
| Tone M100 | 32.82 | 33.43 | 25.37 | 29.82 | 31.82 | 46.15 | 37.28 |
| Reactive Diluents (in % by weight) | | | | | | | |
| SR351 | 10.00 | 10.00 | 16.00 | 14.00 | 16.00 | — | — |
| SR454 | — | — | — | — | — | 25.0 | — |
| SR499 | 13.00 | 13.00 | 10.00 | 10.00 | 10.00 | — | — |

TABLE 4-continued

| Example | I | J | K | L | M | N | O |
|---|---|---|---|---|---|---|---|
| SR502 | 13.00 | 13.00 | 10.00 | 12.00 | 10.00 | — | 25.00 |
| Photoinitiators (in phr) | | | | | | | |
| Benzophenone | 2.00 | 2.00 | 2.00 | 2.00 | 2.00 | 2.00 | 2.00 |
| Irgacure 184 | 1.00 | 1.00 | 1.00 | 1.00 | 1.00 | 1.00 | 1.00 |
| Flow Aids (in phr) | | | | | | | |
| Silwet L7604 | 0.2 | 0.2 | 0.2 | 0.2 | 0.2 | 0.2 | 0.2 |
| Oligomer Equivalent Ratio | | | | | | | |
| NCO/OH | 0.933 | 0.934 | 1.000 | 1.000 | 1.091 | 1.000 | 1.000 |
| Hydroxyacrylate /polyol | 3.24 | 3.24 | 1.50 | 3.00 | 3.26 | 2.00 | 2.00 |
| Comparative Properties | | | | | | | |
| Stain Resistance, ΔE | 210 | 213 | 138 | 194 | 95 | 231 | 192 |
| Gloss Retention, % | 89 | 91 | 87 | 81 | 58 | 90 | 79 |
| Gouge Resistance | 4 | 4 | 7 | 6 | 6 | 3 | 3 |

Desmodur N100 is a biuret isocyanate derived from hexamethylene diisocyanate. It has an equivalent weight of 191.

Desmodur N3200 is a biuret isocyanate derived from hexamethylene diisocyanate. It has an equivalent weight of 181.

Desmodur N3400 is a uretidione isocyanate. It has an equivalent weight of 193.

Polyisocyanate A is a mixture of polyisocyanates containing allophanate. It has an equivalent weight of 220.

Polyisocyanate B is a partial timer of methyl-bis(4-cyclohexylisocyanate). It has an equivalent weight of 178.7.

We claim:

1. A floor covering comprising a base layer and wear layer adhered to the base layer, the wear layer comprising a cured coating composition, the coating composition comprising a (meth)acrylate reactive diluent having a number average molecular weight of at least 200 and less than 2000, and the reaction product of a polyisocyanate with 3 to 6 isocyanate functionalities per molecule, an aromatic polyester polyol and a hydroxyalkyl(meth)acrylate with a number average molecular weight of 344 to 472.

2. The floor covering of claim 1, wherein the (meth)acrylate diluent is selected from the group consisting of ethoxylated tri(meth)acrylate and proproxylated tri(meth)acrylate.

3. The floor covering of claim 1, wherein the (meth)acrylate diluent is selected from the group consisting of (meth)acrylic acid, isodecyl (meth)acrylate, N-vinyl formamide, isobornyl (meth)acrylate, tetraethylene glycol (meth)acrylate, tripropylene glycol (meth)acrylate, hexanediol di(meth)acrylate, ethoxylated bisphenol-A di(meth)acrylate, ethoxylated neopentyl glycol di(meth)acrylate, propoxylated neopentyl glycol di(meth)acrylate, ethoxylated tripropylene glycol di(meth)acrylate, glyceryl propoxylated tri(meth)acrylate, tris (2-hydroxy ethyl) isocyanurate tri(meth)acrylate, pentaerythritol tri(meth)acrylate, pentaerythritol tetra(meth)acrylate, dimethylol propane tri(meth)acrylate dipentaerythritol monohydroxypenta(meth)acrylate, and trimethylol propane tri(meth)acrylate and its ethoxylated and propoxylated analogues of the skeletal structure selected from the group consisting of

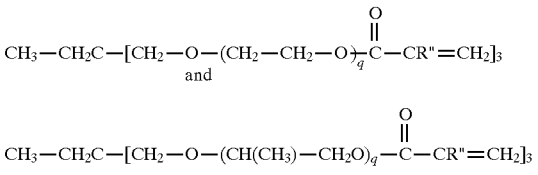

where

R"=H or $CH_3$, and q=0, 1, 2, . . . , 9 or 10.

4. The floor covering of claim 1, wherein the (meth)acrylate diluent is selected from the group consisting of tetraethylene glycol diacrylate, ethoxylated bisphenol-A diacrylate, trihydroxyethyl isocyanurate triacrylate, trimethylol propane triacrylate, and ethoxylated trimethylol propane triacrylate.

5. The floor covering of claim 1, wherein the coating composition further comprises a photoinitiator.

6. The floor covering of claim 5, wherein the photoinitiator is selected from the group consisting of benzophenone, 4-methylbenzophenone, benzyl dimethyl ketal, diethoxy acetophenone, benzoin ethers, thioxanthones, 1-hydroxycyclohexyl phenyl ketone, 2-hydroxy-2-methyl-1-phenol-propane-1one, 4-(2-hydroxyethoxy)phenyl-(2-hydroxy-2-methylpropyl) ketone, 2,4,6-trimethylbenzoyl diphenylphosphine oxide, bis (2,6-dimethoxybenzoyl)-2,4,4-trimethylpentyl phosphine oxide, 2,2-dimethoxy-2-phenyl acetophenone, 2-benzyl-2-N,N-dimethylamino-1-(4-morpholinophenyl)-1-butanone and 2-methyl-1-[4-(methylthio)phenyl]-2-morpholino propan-1-one.

7. The floor covering of claim 5, wherein the photoinitiator is a mixture of benzophenone and 1-hydroxycyclohexyl phenyl ketone.

8. The floor covering of claim 1, wherein the aromatic polyester polyol is a polyester polyol of acid number of less than 15 comprising the reaction product of an equivalent excess of one or more polyols of equivalent weight less than 150 with at least one of the group consisting of a polycarboxylic acid, a polycarboxylic anhydride, and an ester of a polycarboxylic acid, wherein at least 50 equivalent percent of the polycarboxylic acid, polycarboxylic anhydride or ester of a polycarboxylic acid is selected from the group consisting of an aromatic polycarboxylic acid, an aromatic polycarboxylic anhydride, an ester of an aromatic polycarboxylic acid, and mixtures thereof.

9. The floor covering of claim 8 wherein the aromatic polycarboxylic acid, aromatic polycarboxylic anhydride or ester of an aromatic polycarboxylic acid is selected from the group consisting of isophthalic acid, phthalic acid, terephthalic acid, phthalic anhydride, and dimethyl terephthalate.

10. The floor covering of claim 1 wherein the polyisocyanate is selected from the group consisting of an isocyanurate, a biuret and an allophanate.

11. The floor covering of claim 1 wherein the polyisocyanate is selected from the group consisting of those prepared from 1,6 hexamethylene diisocyanate; methylene-bis(4-cyclohexylisocyanate); 1-isocyanato-3-isocyanatomethyl-3,5,5-trimethylcyclohexane; 2,2,4-trimethylhexamethylene diisocyanate; 2,4,4-trimethylhexamethylene diisocyanate; toluene diisocyanate; methylenediphenyl diisocyanate; and tetra methylxylene diisocyanate.

12. The floor covering of claim 1 wherein the polyisocyanate is a trimer isocyanate derived from hexamethyl diisocyanate, the aromatic polyester polyol is a phthalate polyester polyol wherein at least 50 equivalent percent of the polyol is 1,6-hexanediol and at least 50 equivalent percent of the polycarboxylic acid is phthalic acid or phthalic anhydride, and the hydroxyalkyl(meth)acrylate is a polycaprolactone based hydroxy(meth)acrylate having an average molecular weight of about 344, the trimer isocyanate having an equivalent weight of about 195 and an average functionality of about 3.5.

13. A floor covering comprising a base layer and wear layer adhered to the base layer, the wear layer comprising the reaction product of a polyisocyanate with 3 to 6 isocyanate functionalities per molecule, an aromatic polyester polyol and a hydroxyalkyl(meth)acrylate with a number average molecular weight of 344 to 472, and a (meth) acrylate reactive diluent having a number average molecular weight of at least 200 and less than 2000, the hydroxyalkyl (meth)acrylate being a polycaprolactone based hydroxy (meth)acrylate having the formula:

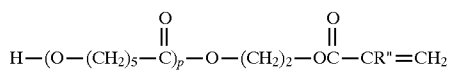

14. A floor covering comprising a base layer and wear layer adhered to the base layer, the wear layer comprising the reaction product of a polyisocyanate with 3 to 6 isocyanate functionalities per molecule, an aromatic polyester polyol and a hydroxyalkyl(meth)acrylate with a number average molecular weight of 344 to 472, and a (meth) acrylate reactive diluent having a number average molecular weight of about 296 to about 1220.

15. The floor covering of claim 14 wherein the (meth) acrylate reactive diluent has a number average molecular weight of at least 296 and no more than 1220.

* * * * *